(12) United States Patent
Lu (10) Patent No.: US 10,447,399 B2
(45) Date of Patent: Oct. 15, 2019

(54) METHOD AND SYSTEM FOR RESTORING OPTICAL LAYER SERVICE

(71) Applicant: ZTE CORPORATION, Shenzhen, Guangdong Province (CN)

(72) Inventor: Gang Lu, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/535,412

(22) PCT Filed: Oct. 23, 2015

(86) PCT No.: PCT/CN2015/092728
§ 371 (c)(1),
(2) Date: Jun. 13, 2017

(87) PCT Pub. No.: WO2016/095610
PCT Pub. Date: Jun. 23, 2016

(65) Prior Publication Data
US 2017/0366269 A1    Dec. 21, 2017

(30) Foreign Application Priority Data
Dec. 15, 2014 (CN) .......................... 2014 1 0779355

(51) Int. Cl.
*H04J 14/00* (2006.01)
*H04B 10/27* (2013.01)
(Continued)

(52) U.S. Cl.
CPC .......... *H04B 10/27* (2013.01); *H04J 14/0227* (2013.01); *H04L 45/28* (2013.01);
(Continued)

(58) Field of Classification Search
CPC ...... H04B 10/27; H04J 14/0227; H04L 45/28; H04L 45/50; H04L 45/62; H04L 47/724; H05K 999/99
(Continued)

(56) References Cited

U.S. PATENT DOCUMENTS 7,961,644 B2 * 6/2011 Sone ...................... H04L 45/00
370/252

FOREIGN PATENT DOCUMENTS

CN   101400005 A   4/2009
CN   101453670 A   6/2009
(Continued)

OTHER PUBLICATIONS

Don Choi, DISA, Falls Church, Virginia, et al., Priority-Based Optical Network Protection and Restoration With Application to DOD Networks, 2003 IEEE. XP10698256A.
(Continued)

*Primary Examiner* — Mohammad R Sedighian
(74) *Attorney, Agent, or Firm* — McDonald Hopkins LLC (57) ABSTRACT

The present document discloses a method and a system for restoring an optical layer service. The method includes: determining wavelength resource occupancy information of an inner-link of the node and an optical layer link where the node is located; herein the wavelength resource occupancy information includes resource occupancy state information of a wavelength resource corresponding to a Hold Priority; and flooding the wavelength resource occupancy information in a network where the node is located.

15 Claims, 4 Drawing Sheets

(51) Int. Cl.
*H04L 12/703* (2013.01)
*H04J 14/02* (2006.01)
*H04L 12/721* (2013.01)
*H04L 12/723* (2013.01)
*H04L 12/913* (2013.01)

(52) U.S. Cl.
CPC .............. *H04L 45/50* (2013.01); *H04L 45/62* (2013.01); *H04L 47/724* (2013.01)

(58) Field of Classification Search
USPC ....................................................... 398/57–73
See application file for complete search history.

(56) References Cited

FOREIGN PATENT DOCUMENTS

| CN | 102694724 A | 9/2012 |
|---|---|---|
| CN | 102801602 A | 11/2012 |
| EP | 2071772 A1 | 6/2009 |
| EP | 1335627 A2 | 8/2013 |
| JP | 2008245225 A | 10/2008 |

OTHER PUBLICATIONS

Joana Socrates Dantas, University of Sao Paulo, LARC—Computer Networks and Architecture Laboratory, Brazil, et al., PCE Algorithm for Traffic Grooming and QoS in Multi-Layer/Multi-Domain IP over WDM Networks, ICTON 2011, Mo.B3.1, 2011 IEEE. XP31911669A.

Edgard Jamhour, Pontifical Catholic University of Parana—PUCPR, PPGIA, et al., A State-Based Availability Model to Shared Mesh Protection in MPLS-TP Networks with Preemption Support, 2012 IEEE Network Operations and Management Symposium (NOMS): Mini-Conference. XP32448762A.

* cited by examiner

METHOD AND SYSTEM FOR RESTORING OPTICAL LAYER SERVICE

TECHNICAL FIELD

The present application relates to, but is not limited to, the field of optical communication technology.

BACKGROUND

In the Automatically Switched Optical Network (ASON), for setup of the Label Switched Path (LSP) for a transmission service, it is required to compute by using a path computation algorithm, Constrained Shortest Path First (CSPF), based on topology resources of the current Network. When computing a path, a route computation element is a Routing Controller (RC), which is a route computation element installed within a node, or a Path Computation Element (PCE), which is a route computation element installed external to the node. The route computation element is generally based on the principle of First Come, First Compute, that is, an LSP service which is initiated to be set up first requires to preempt optimal resources of a topology (such as the shortest path, etc.) preferentially.

Therefore, in the current network, when more and more LSP paths are set up, and the setup paths are not released, then available resources of the topology of the network will be gradually reduced, which may ultimately cause that resources (an optical layer or an electrical layer) on some of the paths are exhausted and an available LSP path cannot be computed since resources of the topology have been occupied. In this case, even for a service with a very high level (such as a diamond-level service), when a fault occurs, it cannot ensure restoring rerouting of the service with the very high level is successful, which strongly affects user experience of a service at a high reliability level. As a result, some operators propose an idea of resource preemption, that is, for that restoring scenario, resources of other services are allowed to be preempted. Of course, since preemption will cause interruption of other services, the preemption is mainly used only when the service is restored.

For the abovementioned scenario, currently, G.709 V3 routing standard proposal, draft-ietf-ccamp-gmpls-ospf-g709v3, defines 8 priorities (priority 0 to priority 7, where 0 is the highest priority and 7 is the lowest priority) for each available ODUk timeslot in link resource information of Optical Data Unit k (ODUk) flooded according to the Open Shortest Path First (OSPF) protocol. The format of Bandwidth sub-TLV (Type Length Value) as shown in Table 1 below is as follows:

TABLE 1

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type = 1 (Unres-fix) | | | | | | | | | | | | | | | | Length | | | | | | | | | | | | | | | |
| Signal type | | | | | Num of stages | | | | | | | T | S | TSG | | | Res | | | | | | | Priority | | | | | | | |
| Stage #1 | | | | | ... | | | | | | | | | Stage #N | | | | | | | | | | Padding | | | | | | | |
| Unreserved ODUj at Prio 0 | | | | | | | | | | | | | | | | | | | | | | | | | | | | | | | |
| Unreserved ODUj at Prio 7 | | | | | | | | | | | | | | | | | | | | | | Unreserved Padding | | | | | | | | | |

Figure 1:
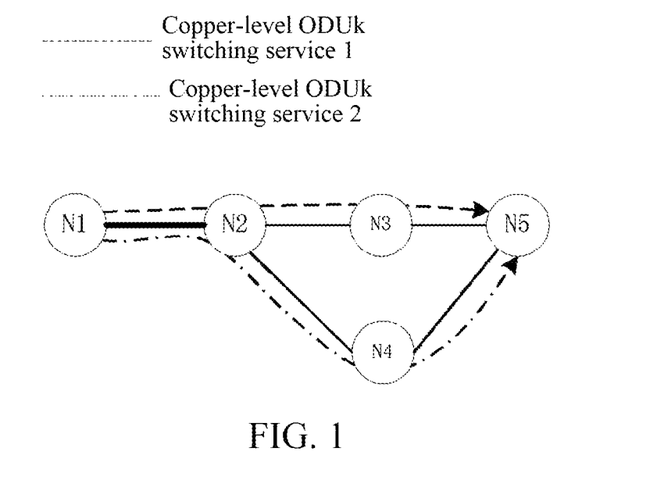
FIG. 1 is a schematic diagram of priority preemption for restoring an ODUk service in the existing technology.

Herein, the Unreserved ODUj at Prio 0 to the Unreserved ODUj at Prio 7 represent the numbers of timeslots of idle ODUj at the priority 0 to the priority 7, respectively. In practical application, a Setup Priority and a Hold Priority are designated to each LSP service. The rule is determined that when a service at high "Setup Priority" is being restored and rerouted, if available idle resources are insufficient, resources occupied by other services at low "Hold Priority" may be preempted to ensure that the service at high "Setup Priority" is restored successfully preferentially. For example, as shown in FIG. 1, for the copper-level ODUk switching service 1, of which the "Setup Priority" is 2 and the "Hold Priority" is 1; for the copper-level ODUk switching service 2, of which the "Setup Priority" is 4 and the "Hold Priority" is 3, when the copper-level service 1 breaks down to trigger dynamic rerouting, and there is no idle resources (resources are occupied by the copper-level service 2), since the "Setup Priority" of the copper-level service 1 is higher than the "Hold Priority" of the copper-level service 2, during path computation for restoring the copper-level service 1, the resource occupied by the copper-level service 2 may be preempted to realize successful restoration of the copper-level service 1. After an OSPF protocol stack floods available ODU timeslots on each electrical layer link according to the priorities, the RC or the PCE can select preemptable resources one priority by one priority according to priorities from the lowest priority to the highest priority during the route computation, based on the abovementioned method, thus completing the path computation.

At present, what is proposed in the current standard is limited to priority extension of the available timeslots of an ODUk link, that is, what is proposed in the current standard only solves the preemption when the ODUk link has no idle resources. This method can only solve the problem of priority preemption for restoring an electrical layer service. But with respect to priority preemption for restoring an optical layer service, there is no solution.

SUMMARY

A summary of the subject matter described in detail in the document is given below. The summary is not intended to limit the scope of the claims.

The present document provides a method and a system for restoring an optical layer service, which can realize priority preemption for restoring an optical layer service.

A method for restoring an optical layer service, applied to a node, includes:

determining wavelength resource occupancy information of an inner-link of the node and an optical layer link where the node is located; herein, the wavelength resource occupancy information includes resource occupancy state information of a wavelength resource corresponding to a Hold Priority;

flooding the wavelength resource occupancy information of the inner-link of the node and the optical layer link where the node is located in a network where the node is located.

In an exemplary embodiment, the method further includes the following feature:

determining wavelength resource occupancy information of an inner-link of the node and an optical layer link where the node is located, includes:

for any one of the inner-links or any one of the optical layer links, determining wavelength resource occupancy information of the link, which includes:

grouping by the Hold Priority, and each priority group contains resource occupancy state information of all wavelength resources of the link corresponding to the Hold Priority of the priority group; or grouping by a wavelength, and each wavelength group contains resource occupancy state information of a wavelength resource of the wavelength corresponding to all Hold Priorities.

In an exemplary embodiment, the method further includes the following feature:

for any one of the inner-links or any one of the optical layer links, determining wavelength resource occupancy information of the link, which includes:

if a wavelength resource on the link has been allocated to a service at a Hold Priority m, then when determining the wavelength resource occupancy information of the link, a resource occupancy state of the wavelength resource in each group of which a priority is equal to or lower than the Hold Priority m is configured as occupied in case of grouping by the Hold Priority, or a resource occupancy state of the wavelength resource corresponding to a priority equal to or lower than the Hold Priority m is configured as occupied in a wavelength group where the wavelength resource is located in case of grouping by the wavelength.

In an exemplary embodiment, the method further includes the following feature:

the inner-link of the node is a link resource obtained by abstracting a related connectivity relationship between an Optical Channel, OCh, layer and an Optical Data Unit k, ODUk, layer in the node.

A method for restoring an optical layer service, applied to a route computation element, includes:

determining a restoring Label Switched Path, LSP, of a service to be restored when the service requires to be restored;

acquiring wavelength resource occupancy information of an inner-link of each node on the restoring LSP and wavelength resource occupancy information of each optical layer link on the restoring LSP;

preempting a wavelength resource on the restoring LSP according to the wavelength resource occupancy information; and informing each node on the restoring path LSP to allocate a resource for the service to be restored after a wavelength resource satisfying a path connectivity requirement is preempted.

In an exemplary embodiment, the method further includes the following feature:

preempting a wavelength resource on the restoring LSP according to the wavelength resource occupancy information, includes:

performing preemption of a wavelength resource on the inner-link of each node and each optical layer link on the restoring LSP according to a preemption strategy and the wavelength resource occupancy information;

herein, the preemption strategy is that: if a Setup Priority of a service A is higher than a Hold Priority of a service B, the service A can preempt a wavelength resource of the service B when restoring.

In an exemplary embodiment, the method further includes the following feature:

performing preemption of a wavelength resource on the inner-link of each node and each optical layer link on the restoring LSP according to a preemption strategy and the wavelength resource occupancy information, includes:

for any one of the inner-links or any one of the optical layer links on the restoring LSP, if occupancy states of a wavelength resource on the link corresponding to all of Hold priorities are unoccupied, or if all of Hold Priorities corresponding to all occupancy states of a wavelength resource are lower than a Setup Priority of the service to be restored, determining that the wavelength resource can be preempted.

In an exemplary embodiment, the method further includes the following feature:

the path connectivity requirement includes: the wavelength resource can be preempted by the service to be restored on each link on the restoring LSP;

herein, the link includes the inner-link of a node and the optical layer link.

In an exemplary embodiment, the method further includes the following feature:

determining a restoring Label Switched Path, LSP, of a service to be restored, includes:

computing the restoring Label Switched Path (LSP) for the service to be restored by using Constrained Shortest Path First (CSPF) algorithm; or computing an optimal restoring LSP by using the CSPF algorithm when determining the restoring Label Switched Path (LSP) for the service to be restored for a first time, and when the optimal restoring LSP fails to preempt a wavelength resource satisfying the path connectivity requirement, re-computing a restoring LSP by using a K Shortest Path (KSP) algorithm.

A system for restoring an optical layer service, applied to a node, includes:

a wavelength resource statistics module configured to determine wavelength resource occupancy information of an inner-link of the node and an optical layer link where the node is located; herein the wavelength resource occupancy information includes resource occupancy state information of a wavelength resource corresponding to a Hold Priority;

a flooding module configured to flood the wavelength resource occupancy information of the inner-link of the node and the optical layer link where the node is located, in a network where the node is located.

In an exemplary embodiment, the system further includes the following feature:

the wavelength resource statistics module is configured to, for any one of the inner-link or any one of the optical layer link, determine wavelength resource occupancy information of the link, which includes:

grouping by the Hold Priority, and each priority group contains resource occupancy state information of all wavelength resources of the link corresponding to the Hold Priority of the priority group; or grouping by a wavelength, and each wavelength group contains resource occupancy state information of a wavelength resource of the wavelength corresponding to all Hold Priorities.

In an exemplary embodiment, the system further includes the following feature:

the wavelength resource statistics module is configured to, if a wavelength resource on the link has been allocated to a service at a Hold Priority m, then when determining the wavelength resource occupancy information of the link, configure a resource occupancy state of the wavelength resource in each group of which a priority is equal to or lower than the Hold Priority m as occupied in case of grouping by the Hold Priority, or configure a resource occupancy state of wavelength resource corresponding to a priority equal to or lower than the Hold Priority m as occupied in a wavelength group where the wavelength resource is located in case of grouping by the wavelength.

A system for restoring an optical layer service, applied to a route computation element, includes a path computation module, a wavelength resource information acquiring module, a wavelength resource preempting module and a resource allocation module.

The path computation module is configured to determine a restoring Label Switched Path (LSP) of a service to be restored when the service requires to be restored.

The wavelength resource information acquiring module is configured to acquire wavelength resource occupancy information of an inner-link of each node on the restoring LSP and wavelength resource occupancy information of each optical layer link on the restoring LSP.

The wavelength resource preempting module is configured to preempt a wavelength resource on the restoring LSP according to the wavelength resource occupancy information.

The resource allocation module is configured to inform each node on a restoring path LSP to allocate a resource for the service to be restored after a wavelength resource which satisfies a path connectivity requirement is preempted.

In an exemplary embodiment, the system further includes the following feature:

the wavelength resource preempting module is configured to, perform preemption of a wavelength resource on the inner-link of each node and each optical layer link on the restoring LSP according to a preemption strategy and the wavelength resource occupancy information;

herein, the preemption strategy is that: if a Setup Priority of a service A is higher than a Hold Priority of a service B, the service A can preempt a wavelength resource of the service B when restoring.

In an exemplary embodiment, the system further includes the following feature:

the wavelength resource preempting module is configured to, for any one of the inner-link or any one of the optical layer link on the restoring LSP, if occupancy states of a wavelength resource on the link corresponding to all Hold priorities are unoccupied, or if all Hold Priorities corresponding to all occupancy states of a wavelength resource are lower than a Setup Priority of the service to be restored, determine that the wavelength resource can be preempted.

In an exemplary embodiment, the system further includes the following feature:

the path connectivity requirement includes: the wavelength resource can be preempted by the service to be restored on each link on the restoring LSP;

herein, the link includes the inner-link of a node and the optical layer link.

A computer-readable storage medium storing computer-executable instructions is provided, and the computer-executable instructions are used to execute any method above-mentioned.

Compared with the existing art, the method and system for restoring an optical layer service provided by the embodiments of the present disclosure realize priority preemption for restoring the optical layer service, by means of configuring a Setup Priority and Hold Priority for the optical layer service, flooding wavelength occupancy situations of an optical layer link between nodes and the abstracted link within the node according to the Hold Priorities, and according to the preemption strategy that an optical layer service at a higher Setup Priority can preempt a wavelength resource of services at a lower Hold Priority lower.

After reading and understanding the drawings and detailed description, other aspects can be understood.

DETAILED DESCRIPTION

The embodiments of the present document will be described in detail below in conjunction with accompanying drawings. It should be illustrated that, under the situation of no conflict, the embodiments and the features in the embodiments in the present application can be freely combined.

Computation of an optical layer path may include as path computation and wavelength allocation. Herein, an inner-link within a node may be abstracted for an actual device, and a connectivity relationship between an Optical Data Unit k (ODUk) layer and an Optical Channel (OCh) layer is abstracted as an inner-link within the node. Based on this idea, occupancy information of a wavelength on an optical layer link may be flooded according to 0 to 7 priorities, and occupancy state information at the 0 to 7 priorities of a wavelength on the abstracted inner-link in the node are also flooded; then, based on flooded information, wavelength resources are preempted according to the priorities to obtain a path of priority preemption for restore.

Figure 2:
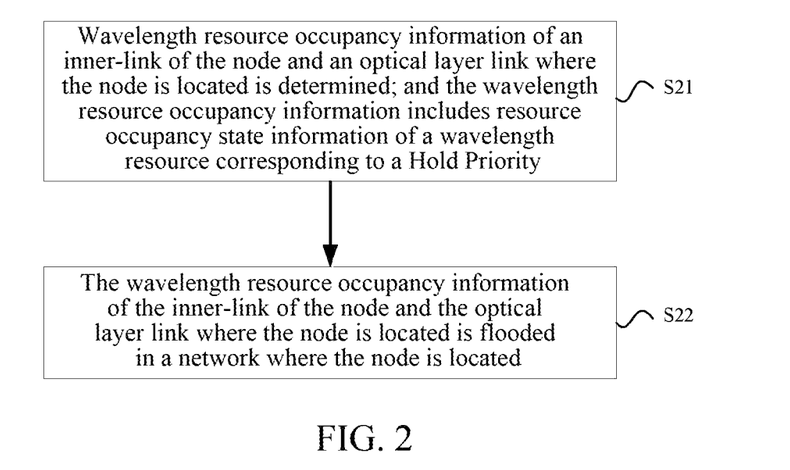
FIG. 2 is a flow chart of a method, at a side of a node, for restoring an optical layer service in accordance with an embodiment of the present disclosure.

As shown in FIG. 2, an embodiment of the present disclosure provides a method for restoring an optical layer service, which is applied to a node, and the method includes steps S21-S22.

In step S21, wavelength resource occupancy information of an inner-link of the node and an optical layer link where the node is located is determined; herein the wavelength resource occupancy information includes resource occupancy state information of a wavelength resource corresponding to a Hold Priority.

In step S22, the wavelength resource occupancy information of the inner-link of the node and the optical layer link where the node is located is flooded in a network where the node is located.

The method further includes the following features.

The node is located in an Automatically Switched Optical Network (ASON).

The inner-link of the node is a link resource obtained by abstracting a related connectivity relationship between an Optical Channel, (OCh) layer and an Optical Data Unit k, (ODUk) layer in the node.

The Hold Priority includes eight priorities.

That the wavelength resource occupancy information is flooded in a network where the node is located, includes that the wavelength resource occupancy information is flooded in the network where the node is located by the Open Shortest Path First (OSPF) protocol.

That the wavelength resource occupancy information of the inner-link of the node and the optical layer link where the node is located is determined, includes:

for any one of the inner-link or any one of the optical layer link, wavelength resource occupancy information of the link is determined, which includes:

grouping by the Hold Priority, and each priority group contains resource occupancy state information of all wavelength resources of the link corresponding to the Hold Priority of the priority group; or grouping by a wavelength, and each wavelength groups contains resource occupancy state information of a wavelength resource of the wavelength corresponding to all the priorities.

Herein, for any one of the inner-link or any one of the optical layer link, wavelength resource occupancy information of the link is determined, which includes:

if a wavelength resource on the link has been allocated to a service at a Hold Priority m, then when determining the wavelength resource occupancy information on the link, a resource occupancy state of the wavelength resource in each group of which a priority is equal to or lower than the Hold Priority m is configured as occupied in case of grouping by the Hold Priority, or a resource occupancy state of wavelength resource corresponding to a priority equal to or lower than the Hold Priority m is configured as occupied in a wavelength group where the wavelength resource is located in case of grouping by the wavelength.

For example, a TLV format for wavelength occupancy information may include two types as follows, which are shown in Table 2 and Table 3, respectively:

TABLE 2

| (Type = TBD) | Length = variable |
| Priority | Padding |
|---|---|
| Priority 0 Wavelength(192 bit) | |
| Priority 1 Wavelength(192 bit) | |
| ... | |
| Priority 7 Wavelength(192 bit) | |

TABLE 3

| (Type = TBD) | | Length = variable | |
|---|---|---|---|
| Priority | | Padding | |
| λ1(0 ~ 7 bit) | λ2(0 ~ 7 bit) | λ3(0 ~ 7 bit) | λ4(0 ~ 7 bit) |
| ... | | | |
| λ189(0 ~ 7 bit) | λ190(0 ~ 7 bit) | λ191(0 ~ 7 bit) | λ192(0 ~ 7 bit) |

Herein, for each bit, 0 represents the occupied and 1 represents the unoccupied, or 1 represents the occupied and 0 represents the unoccupied.

Figure 3:
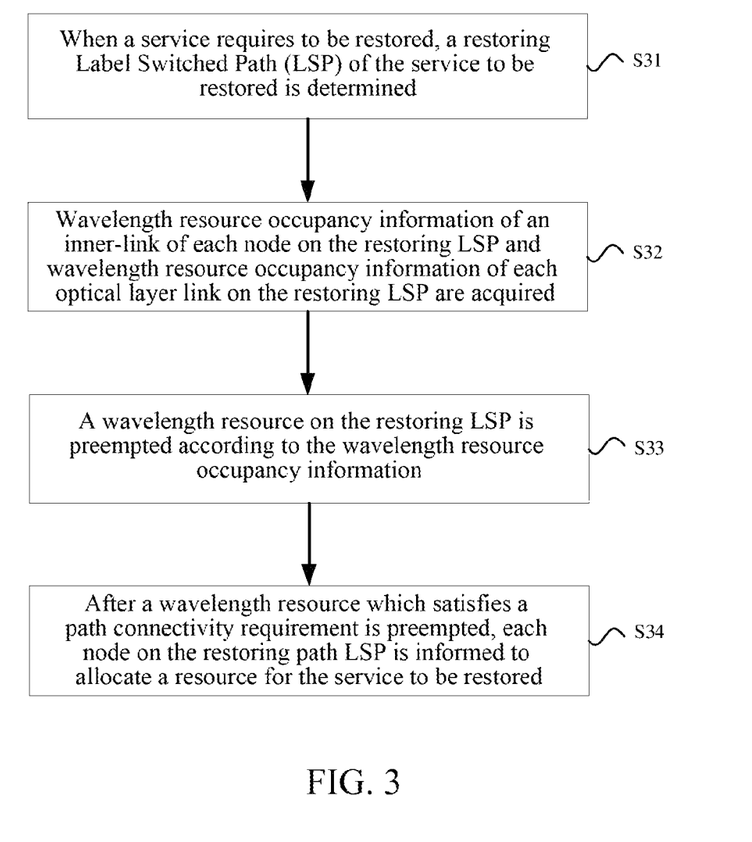
FIG. 3 is a flow chart of a method, at a side of a route computation element, for restoring an optical layer service in accordance with an embodiment of the present disclosure.

As shown in FIG. 3, an embodiment of the present disclosure provides a method for restoring an optical layer service, which is applied to a route computation element, and the method includes steps S31-S34.

In step S31, when a service requires to be restored, a restoring Label Switched Path (LSP) of the service to be restored is determined.

In step S32, wavelength resource occupancy information of an inner-link of each node on the restoring LSP and wavelength resource occupancy information of each optical layer link on the restoring LSP are acquired.

In step S33, a wavelength resource on the restoring LSP is preempted according to the wavelength resource occupancy information.

In step S34, after a wavelength resource satisfying a path connectivity requirement is preempted, each node on the restoring path LSP is informed to allocate a resource for the service to be restored.

The method may further include the following features.

The route computation element includes one or more of the following: a Routing Controller (RC) installed within a node, a Path Computation Element (PCE) installed external to a node.

That the wavelength resource on the restoring LSP is preempted according to the wavelength resource occupancy information, includes:

preemption of a wavelength resource is performed on the inner-link of each node and each optical layer link on the restoring LSP according to a preemption strategy and the wavelength resource occupancy information.

Herein, the preemption strategy is that: if a Setup Priority of a service A is higher than a Hold Priority of a service B, the service A can preempt a wavelength resource of the service B when restoring.

That preemption of the wavelength resource is performed on the inner-link of each node and each optical layer link on the restoring LSP according to a preemption strategy and the wavelength resource occupancy information, includes:

for any one of the inner-link or any one of the optical layer link on the restoring LSP, if occupancy states of a wavelength resource in the link corresponding to all of Hold priorities are unoccupied, or if all of Hold Priorities corresponding to all occupancy states of a wavelength resource are lower than the Setup Priority of the service to be restored, it is determined that the wavelength resource can be preempted.

Herein, the path connectivity requirement includes: the wavelength resource can be preempted by the service to be restored on each link on the restoring LSP.

Herein, the link includes the inner-link of the node and the optical layer link.

Herein, that the restoring Label Switched Path (LSP) of the service to be restored is determined, includes:

the restoring Label Switched Path (LSP) for the service to be restored is computed by using the Constrained Shortest Path First (CSPF) algorithm; or the optimal restoring LSP is computed by using the CSPF algorithm when the restoring Label Switched Path (LSP) for the service to be restored is determined for the first time, and when the optimal restoring LSP fails to preempt the wavelength resource satisfying the path connectivity requirement, a restoring LSP is re-computed by using a K Shortest Path (KSP) algorithm.

Figure 4:
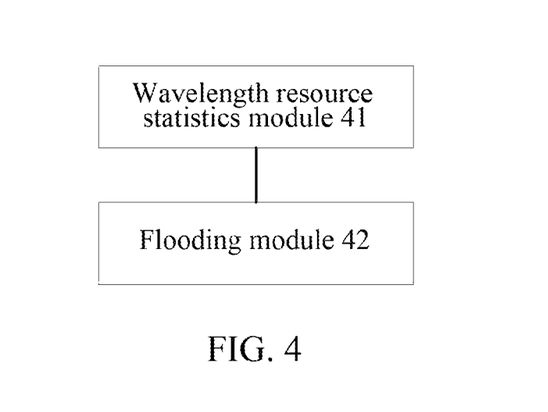
FIG. 4 is a structural diagram of a system, at a side of a node, for restoring an optical layer service in accordance with an embodiment of the present disclosure.

As shown in FIG. 4, an embodiment of the present disclosure provides a system for restoring an optical layer service, which is applied to a node, and the system includes:

a wavelength resource statistics module 41 configured to determine wavelength resource occupancy information of an inner-link of the node and an optical layer link where the node is located; herein the wavelength resource occupancy information includes resource occupancy state information of a wavelength resource corresponding to a Hold Priority;

a flooding module 42 configured to flood the wavelength resource occupancy information of the inner-link of the node and the optical layer link where the node is located, in a network where the node is located.

The system further includes the following features.

The wavelength resource statistics module 41 is configured to determine the wavelength resource occupancy information of the inner-link of the node and the optical layer link where the node is located, which includes:

for any one of the inner-link or any one of the optical layer link, that wavelength resource occupancy information of the link is determined, includes:

grouping by the Hold Priority, and each priority group contains resource occupancy state information of all wavelength resources of the link corresponding to the Hold Priority of the priority group; or grouping by the wavelength, and each wavelength group contains resource occupancy state information of a wavelength resource of the wavelength corresponding to all priorities.

Herein, the wavelength resource statistics module 41 is configured to, for any one of the inner-link or any one of the optical layer link, determine wavelength resource occupancy information of the link, which includes:

if a wavelength resource on the link has been allocated to a service at a Hold Priority m, then when determining the wavelength resource occupancy information on the link, a resource occupancy state of the wavelength resource in each group of which a priority is equal to or lower than the Hold Priority m is configured as occupied in case of grouping by the Hold Priority, or a resource occupancy state of wavelength resource corresponding to a priority equal to or lower than the Hold Priority m is configured as occupied in a wavelength group where the wavelength resource is located in case of grouping by the wavelength.

The inner-link of the node is a link resource obtained by abstracting a related connectivity relationship between an Optical Channel (OCh) layer and an Optical Data Unit k (ODUk) layer in the node.

The Hold Priority includes eight priorities.

The route computation element is a Routing Controller (RC) which is a route computation element installed within a node or a Path Computation Element (PCE) which is a route computation element installed external to a node.

Figure 5:
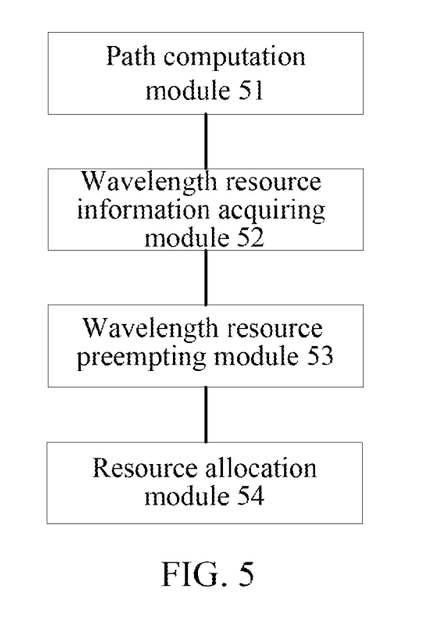
FIG. 5 is a structural diagram of a system, at a side of a route computation element, for restoring an optical layer service in accordance with an embodiment of the present disclosure.

As shown in FIG. 5, an embodiment of the present disclosure provides a system for restoring an optical layer service, which is applied to a route computation element, and the system includes a path computation module 51, a wavelength resource information acquiring module 52, a wavelength resource preempting module 53 and a resource allocation module 54.

The path computation module 51 is configured to determine a restoring Label Switched Path (LSP) of a service to be restored when the service requires to be restored.

The wavelength resource information acquiring module 52 is configured to acquire wavelength resource occupancy information of an inner-link of each node on the restoring LSP and wavelength resource occupancy information of each optical layer link on the restoring LSP.

The wavelength resource preempting module 53 is configured to preempt a wavelength resource on the restoring LSP according to the wavelength resource occupancy information.

The resource allocation module 54 is configured to inform each node on a restoring path LSP to allocate a resource for the service to be restored after a wavelength resource satisfying a path connectivity requirement is preempted.

The system further includes the following features.

The wavelength resource preempting module 53 is configured to preempt a wavelength resource on the restoring LSP according to the wavelength resource occupancy information, which includes:

preemption of a wavelength resource is performed on the inner-link of each node and each optical layer link on the restoring LSP according to a preemption strategy and the wavelength resource occupancy information.

The preemption strategy is that: if a Setup Priority of a service A is higher than a Hold Priority of a service B, the service A can preempt wavelength resources of the service B when restoring.

The wavelength resource preempting module 53 is configured to perform preemption of the wavelength resource on the inner-link of each node and each optical layer link on the restoring LSP according to the preemption strategy and the wavelength resource occupancy information, which includes:

for any one of the inner-link or any one of the optical layer link on the restoring LSP, if occupancy states of a wavelength resource in the link corresponding to all of Hold Priorities are unoccupied, or if all of Hold Priorities corresponding to all occupancy states of a wavelength resource are lower than the Setup Priority of the service to be restored, it is determined that the wavelength resource can be preempted.

The path connectivity requirement includes: the wavelength resource can be preempted by the service to be restored on each link on the restoring LSP.

The link includes the inner-link of a node and the optical layer link.

The path computation module 51 is configured to determine a restoring Label Switched Path (LSP) of the service to be restored, which includes:

the restoring Label Switched Path (LSP) for the service to be restored is computed by using the Constrained Shortest Path First (CSPF) algorithm; or an optimal restoring LSP is computed by using the CSPF algorithm when the restoring Label Switched Path (LSP) for the service to be restored is determined for the first time, and when the optimal restoring LSP fails to preempt the wavelength resource satisfying the path connectivity requirement, a restoring LSP is re-computed by using a K Shortest Path (KSP) algorithm.

Application Example

Figure 6:
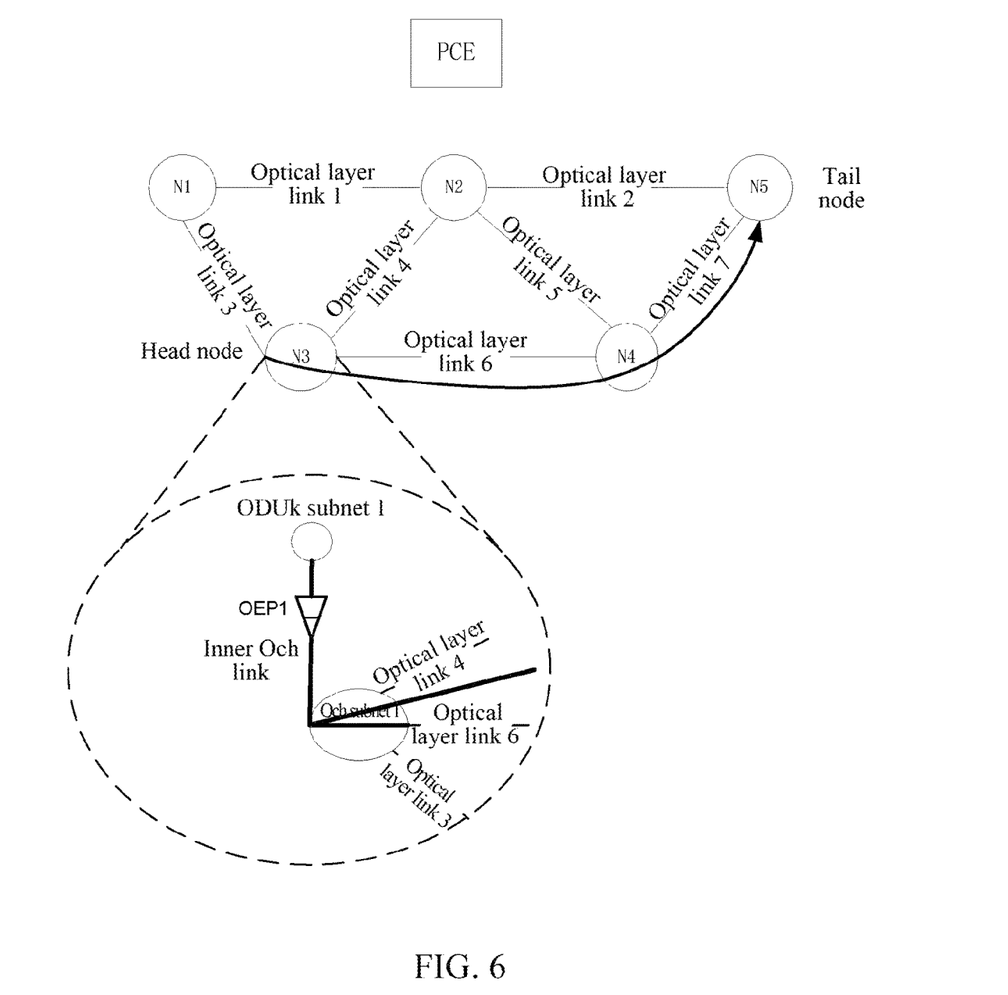
FIG. 6 is a schematic diagram of a topology of a network for restoring an optical layer service according to the application example of the present disclosure.

As shown in FIG. 6, N1, N2, N3, N4 and N5 are five device nodes, and the device nodes are connected by optical layer links 1 to 7 respectively. A restore service 1 on an optical layer LSP needs to be set up from the N3 to the N5, and a Setup Priority of the service 1 is 3, and a Hold Priority of the service 1 is 3.

The N3 node includes an electrical layer sub-structure which is represented as ODUk subnet 1. OEP1 belongs to the ODUk subnet 1. There are 3 optical layer links 3/4/6 on OCh subnet 1. An Optical Electric processor (OEP) is a photoelectric conversion element logically, and there is an abstracted inner-link between the OEP and the OCh subnet 1. The process is described as follows.

1) The device nodes N1 to N5 flood a wavelength priority occupancy situation of the abstracted inner-link within each node and a wavelength priority occupancy situation of each optical layer link.

Take the N3 node as an example.

For the inner-link, λ4 has been occupied by a service at Hold Priority 5, and a priority occupancy situation of the λ4 is P0/P1/P2/P3/P4=1 (unoccupied), and P5/P6/P7=0 (occupied). Therefore, flooded sub-TLV, for priority preemption for restoring, of an abstracted link within the node is as follows. Herein, an occupancy state at each priority of the fourth wavelength is filled. States of other wavelengths are omitted and are not illustrated in Table 4 below.

TABLE 4

| (Type = TBD) | Length = variable |
|---|---|
| Priority | Padding |
| 1 | Priority 0 Wavelength (192 bit) |
| 1 | Priority 1 Wavelength (192 bit) |
| 1 | Priority 2 Wavelength (192 bit) |
| 1 | Priority 3 Wavelength (192 bit) |
| 1 | Priority 4 Wavelength (192 bit) |
| 0 | Priority 5 Wavelength (192 bit) |
| 0 | Priority 6 Wavelength (192 bit) |
| 0 | Priority 7 Wavelength (192 bit) |

For the optical layer link, take optical layer link 6 as an example. λ4 of the optical layer link 6 has been occupied by a service at Hold Priority 5, thus a priority occupancy situation of the λ4 is P0/P1/P2/P3/P4=1 (unoccupied), and P5/P6/P7=0 (occupied). Therefore, flooded sub-TLV, for priority preemption for restoring, of an optical layer link is as shown in Table 5 below. Herein, an occupancy state at each priority of the fourth wavelength is filled.

TABLE 5

| (Type = TBD) | Length = variable |
|---|---|
| Priority | Padding |
| 1 | Priority 0 Wavelength (192 bit) |
| 1 | Priority 1 Wavelength (192 bit) |
| 1 | Priority 2 Wavelength (192 bit) |
| 1 | Priority 3 Wavelength (192 bit) |
| 1 | Priority 4 Wavelength (192 bit) |
| 0 | Priority 5 Wavelength (192 bit) |
| 0 | Priority 6 Wavelength (192 bit) |
| 0 | Priority 7 Wavelength (192 bit) |

2) A Path Computation Element (PCE) computes a restoring path LSP from the N3 to the N5, which is N3-N4-N5 as shown in the figure, by using the CSPF algorithm.

3) Taking the node N3 as an example, wavelength preemption of the abstracted inner-link within the node, includes:

for wavelength λ4 of the abstracted inner-link, an occupancy situation of each priority of the wavelength λ4 is:

P0=1 (unoccupied), P1=1 (unoccupied), P2=1 (unoccupied), P3=1 (unoccupied), P4=1 (unoccupied), P5=0 (occupied), P6=0 (occupied), P7=0 (occupied).

Since the Hold Priorities P5, P6 and P7, which are all in the occupied state, of the wavelength λ4 are lower than a Setup Priority (priority 3) of the optical layer LSP, the λ4 can be preempted.

4) Taking the node N3 as an example, wavelength preemption of an optical layer link, includes:

the wavelength λ4 on optical layer link 6 is preempted.

An occupancy situation of each priority of the wavelength λ4 is:

P0=1 (idle), P1=1 (idle), P2=1 (idle), P3=1 (idle), P4=1 (idle), P5=0 (occupied), P6=0 (occupied), P7=0 (occupied).

Since the Hold Priorities P5, P6 and P7, which are all in the occupied state, of the wavelength λ4 are lower than a Setup Priority (priority 3) of the optical layer LSP, the λ4 can be preempted.

5) After wavelength preemption of the abstracted inner-link within the node and the optical layer link is completed, it is determined whether the wavelength λ4 has connectivity on the path N3-N4-N5, that is, whether the wavelength is available on each link of the LSP (whether the wavelength can be preempted by an optical layer service), and if the wavelength λ4 has the connectivity, it is determined that preemption for a wavelength resource λ4 is successful.

6) It is determined that the LSP can be used to priority preemption for restoring the service, and the PCE informs each node on the LSP to allocate a wavelength resource for restoring the service to set up the service to be restored.

The abovementioned method and system for restoring an optical layer service provided by the embodiments of the present disclosure realize priority preemption for restoring the optical layer service by means of configuring a Setup Priority and Hold Priority for the optical layer service, flooding wavelength occupancy situations of an optical layer link between nodes and the abstracted link within the node according to the Hold Priority, and according to the preemption strategy that an optical layer service at a higher Setup Priority can preempt a wavelength resource of a service at a lower Hold Priority.

Those ordinarily skilled in the art can understand that all or some of the steps of the abovementioned embodiments may be implemented by using a computer program process, the computer program may be stored in a computer-readable storage medium and the computer program may be executed on an appropriate hardware platform (such as a system, equipment, device, component, and so on), and during the execution, it includes one of the steps of the method embodiment or a combination thereof.

In an exemplary embodiment, all or some of the steps of the abovementioned embodiments can also be implemented with integrated circuits, these steps may be made into individual integrated circuit modules respectively, or some of the modules or steps can be made into a single integrated circuit module to implement.

Each device/functional module/functional unit in the abovementioned embodiments may be implemented with universal computing devices, and they can be concentrated on a single computing device or distributed on a network composed of a plurality of computing devices.

When each device/functional module/functional unit in the abovementioned embodiments are implemented in the form of software functional module and sold or used as an individual product, they may be stored in a computer readable storage medium. The abovementioned computer-readable storage medium may be a read-only memory, magnetic or optical disk, and the like.

INDUSTRIAL APPLICABILITY

The embodiments of the present disclosure realize priority preemption for restoring the optical layer service by means of configuring a Setup Priority and Hold Priority for the optical layer service, and flooding wavelength occupancy situations of an optical layer link between nodes and the abstracted link within the node according to the Hold Priority, and according to the preemption strategy that an optical layer service at a higher Setup Priority can preempt a wavelength resource of a service at a lower Hold Priority.

What is claimed is:

1. A method for restoring an optical layer service, applied to nodes and a route computer in a network, and the method comprising:

determining wavelength resource occupancy information of an inner-link of each node in the network and an optical layer link where each node is located; wherein, the wavelength resource occupancy information comprises resource occupancy state information of a wavelength resource corresponding to a Hold Priority;

flooding the wavelength resource occupancy information of the inner-link of each node and the optical layer link where each node is located in the network.

2. The method of claim 1, wherein, the determining wavelength resource occupancy information of an inner-link of each node in the network and an optical layer link where each node is located comprises:

for any one of the inner-links or any one of the optical layer links, determining wavelength resource occupancy information of the link, which comprises:

grouping wavelength resources by the Hold Priority, and each priority group containing resource occupancy state information of all wavelength resources of the link corresponding to the Hold Priority of the priority group; or grouping wavelength resources by a wavelength, and each wavelength group containing resource occupancy state information of a wavelength resource of the wavelength corresponding to all Hold Priorities.

3. The method of claim 2, wherein, for any one of the inner-links or any one of the optical layer links, determining wavelength resource occupancy information of the link, comprises:

if a wavelength resource on the link has been allocated to a service at a Hold Priority m:

in case of grouping wavelength resources by the Hold Priority, when determining the wavelength resource occupancy information of the link, configuring as occupied a resource occupancy state of wavelength resource in each group of which a priority is equal to or lower than the Hold Priority m; or in case of grouping wavelength resources by the wavelength, when determining the wavelength resource occupancy information of the link, in a wavelength group where a wavelength resource is located, configuring as occupied a resource occupancy state of a wavelength resource corresponding to a priority equal to or lower than the Hold Priority m.

4. The method of claim 1, wherein, the inner-link of the node is a link resource obtained by abstracting a related connectivity relationship between an Optical Channel, OCh, layer and an Optical Data Unit k, ODUk, layer in the node.

5. The method of claim 2, wherein the method comprises:

determining a restoring Label Switched Path, LSP, of a service to be restored when the service requires to be restored;

acquiring wavelength resource occupancy information of an inner-link of each node on the restoring LSP and wavelength resource occupancy information of each optical layer link on the restoring LSP;

preempting a wavelength resource on the restoring LSP according to the wavelength resource occupancy information of an inner-link of each node on the restoring LSP and the wavelength resource occupancy information of each optical layer link on the restoring LSP; and informing each node on the restoring path LSP to allocate a resource for the service to be restored after a wavelength resource satisfying a path connectivity requirement is preempted.

6. The method of claim 5, wherein, the preempting a wavelength resource on the restoring LSP comprises:

performing preemption of a wavelength resource on the inner-link of each node and each optical layer link on the restoring LSP according to a preemption strategy and the wavelength resource occupancy information;

wherein, the preemption strategy is that: if a Setup Priority of a service A is higher than a Hold Priority of a service B, the service A can preempt a wavelength resource of the service B when restoring.

7. The method of claim 6, wherein, the performing preemption of a wavelength resource on the inner-link of each node and each optical layer link on the restoring LSP according to a preemption strategy and the wavelength resource occupancy information, comprises:

for any one of the inner-link or any one of the optical layer link on the restoring LSP, if occupancy states of a wavelength resource on the link corresponding to all Hold Priorities are unoccupied, or if all Hold Priorities corresponding to all occupancy states of a wavelength resource are lower than a Setup Priority of the service to be restored, determining that the wavelength resource can be preempted.

8. The method of claim 5, wherein, the path connectivity requirement comprises: the wavelength resource can be preempted by the service to be restored on each link on the restoring LSP;

wherein, the link comprises the inner-link of a node and the optical layer link.

9. The method of claim 5, wherein, the determining a restoring Label Switched Path, LSP, of a service to be restored, comprises:

computing the restoring Label Switched Path, LSP, for the service to be restored by using Constrained Shortest Path First, CSPF, algorithm; or computing an optimal restoring LSP by using the CSPF algorithm when determining the restoring Label Switched Path, LSP, for the service to be restored for a first time, and when the optimal restoring LSP fails to preempt a wavelength resource satisfying the path connectivity requirement, re-computing a restoring LSP by using a K Shortest Path, KSP, algorithm.

10. A system for restoring an optical layer service, applied to nodes and a route computer in a network, and the system comprising:

a universal computer; and a non-transitory computer readable storage medium storing instructions that, when executed by the computer, cause the universal computer to perform steps comprising:

determining wavelength resource occupancy information of an inner-link of each node in the network and an optical layer link where each node is located; wherein the wavelength resource occupancy information comprises resource occupancy state information of a wavelength resource corresponding to a Hold Priority;

flooding the wavelength resource occupancy information of the inner-link of each node and the optical layer link where each node is located, in the network.

11. The system of claim 10, wherein,
for any one of the inner-links or any one of the optical layer links, the determining wavelength resource occupancy information comprises:
grouping wavelength resources by the Hold Priority, and each priority group containing resource occupancy state information of all wavelength resources of the link corresponding to the Hold Priority of the priority group; or
grouping wavelength resources by a wavelength, and each wavelength group containing resource occupancy state information of a wavelength resource of the wavelength corresponding to all Hold Priorities.

12. The system of claim 11, wherein the steps further comprise:
if a wavelength resource on the link has been allocated to a service at a Hold Priority m:
in case of grouping wavelength resources by the Hold Priority, when determining the wavelength resource occupancy information of the link, configuring as occupied a resource occupancy state of a wavelength resource in each group of which a priority is equal to or lower than the Hold Priority m; or
in case of grouping wavelength resources by the wavelength, when determining the wavelength resource occupancy information of the link, in a wavelength group where a wavelength resource is located, configuring as occupied a resource occupancy state of a wavelength resource corresponding to a priority equal to or lower than the Hold Priority m.

13. The system of claim 10, wherein the steps further comprise:
determining a restoring Label Switched Path, LSP, of a service to be restored when the service requires to be restored;
acquiring wavelength resource occupancy information of an inner-link of each node on the restoring LSP and wavelength resource occupancy information of each optical layer link on the restoring LSP;
preempting a wavelength resource on the restoring LSP according to the wavelength resource occupancy information of an inner-link of each node on the restoring LSP and the wavelength resource occupancy information of each optical layer link on the restoring LSP; and
informing each node on the restoring path LSP to allocate a resource for the service to be restored after a wavelength resource satisfying a path connectivity requirement is preempted.

14. The system of claim 13, wherein the steps further comprise:
performing preemption of a wavelength resource on the inner-link of each node and each optical layer link on the restoring LSP according to a preemption strategy and the wavelength resource occupancy information;
wherein, the preemption strategy is that: if a Setup Priority of a service A is higher than a Hold Priority of a service B, the service A can preempt a wavelength resource of the service B when restoring.

15. A non-transitory computer-readable storage medium storing computer-executable instructions, wherein the computer-executable instructions are used to execute the method of claim 1.

* * * * *